US012586552B2

(12) United States Patent
Salamon et al.

(10) Patent No.: US 12,586,552 B2
(45) Date of Patent: Mar. 24, 2026

(54) MULTI-LEVEL AUDIO SEGMENTATION USING DEEP EMBEDDINGS

(71) Applicant: Adobe Inc., San Jose, CA (US)

(72) Inventors: Justin Salamon, San Francisco, CA (US); Oriol Nieto-Caballero, Oakland, CA (US); Nicholas J. Bryan, Belmont, CA (US)

(73) Assignee: Adobe Inc., San Jose, CA (US)

( * ) Notice: Subject to any disclaimer, the term of this patent is extended or adjusted under 35 U.S.C. 154(b) by 959 days.

(21) Appl. No.: 17/742,313

(22) Filed: May 11, 2022

(65) Prior Publication Data

US 2023/0115212 A1 Apr. 13, 2023

Related U.S. Application Data

(60) Provisional application No. 63/254,287, filed on Oct. 11, 2021.

(51) Int. Cl.
*G10H 1/00* (2006.01)

(52) U.S. Cl.
CPC ..... *G10H 1/0008* (2013.01); *G10H 2210/041* (2013.01); *G10H 2210/076* (2013.01); *G10H 2240/131* (2013.01)

(58) Field of Classification Search
CPC ........... G10H 1/0008; G10H 2210/041; G10H 2210/076; G10H 2240/131
USPC ........................................................... 84/602
See application file for complete search history.

(56) References Cited

U.S. PATENT DOCUMENTS

| | | | | |
|---|---|---|---|---|
| 9,633,111 | B1 | 4/2017 | Bennett | |
| 9,684,715 | B1 | 6/2017 | Ross et al. | |
| 2006/0065106 | A1 * | 3/2006 | Pinxteren | G10L 25/48 84/615 |
| 2009/0217804 | A1 | 9/2009 | Lu et al. | |
| 2021/0158086 | A1 | 5/2021 | Salamon et al. | |
| 2021/0224318 | A1 | 7/2021 | Schalkwijk et al. | |

(Continued)

OTHER PUBLICATIONS

Tralie et al. (Enhanced Hierarchical Music Structure Annotations Via Feature Level Similarity Fusion, Feb. 4, 2019) (Year: 2019).*

(Continued)

*Primary Examiner* — Jeffrey Donels
*Assistant Examiner* — Philip G Scoles
(74) *Attorney, Agent, or Firm* — Nicholson De Vos Webster & Elliott LLP

(57) ABSTRACT

Embodiments are disclosed for generating an audio segmentation of an audio sequence using deep embeddings. In particular, in one or more embodiments, the disclosed systems and methods comprise receiving an input including an audio sequence and extracting features for each frame of the audio sequence, where each frame is associated with a beat of the audio sequence. The method may further comprise clustering frames of the audio sequence into one or more clusters based on the extracted features and generating segments of the audio sequence based on the clustered frames, where each segment includes frames of the audio sequence from a same cluster. The method may further comprise constructing a multi-level audio segmentation of the audio sequence and performing a segment fusioning process that merges shorter segments with neighboring segments based on cluster assignments.

20 Claims, 9 Drawing Sheets
(3 of 9 Drawing Sheet(s) Filed in Color)

(56) References Cited

U.S. PATENT DOCUMENTS

| | | | | |
|---|---|---|---|---|
| 2021/0287662 | A1* | 9/2021 | McCallum ............. | G06N 3/045 |
| 2021/0294840 | A1 | 9/2021 | Lee et al. | |
| 2022/0027407 | A1 | 1/2022 | Ikezoye et al. | |
| 2022/0284917 | A1 | 9/2022 | Topchy et al. | |
| 2023/0052033 | A1 | 2/2023 | Chundi et al. | |

OTHER PUBLICATIONS

Jegou et al., "Product Quantization for Nearest Neighbor Search," IEEE Transactions on Pattern Analysis and Machine Intelligence, vol. 33, No. 1, Jan. 2011, pp. 117-128.

Mcfee et al., "Analyzing Song Structure with Spectral Clustering," Proc. of the 15th International Society for Music Information Retrieval Conference, Taipei, Taiwan, 2014, pp. 405-410.

Tralie et al., "Enhanced Hierarchical Music Structure Annotations via Feature Level Similarity Fusion," ICASSP, Proceedings of IEEE International Conference on Acoustics, Speech and Signal Processing, May 2019, pp. 201-205.

Non-Final Office Action, U.S. Appl. No. 17/742,318, filed Feb. 29, 2024, 25 pages.

Final Office Action, U.S. Appl. No. 17/742,318, filed Oct. 21, 2024, 28 pages.

Non-Final Office Action, U.S. Appl. No. 17/742,318, filed Mar. 13, 2025, 30 pages.

* cited by examiner

MULTI-LEVEL AUDIO SEGMENTATION USING DEEP EMBEDDINGS

CROSS-REFERENCE TO RELATED APPLICATIONS

This application claims the benefit of U.S. Provisional Application No. 63/254,287, filed Oct. 11, 2021, which is hereby incorporated by reference.

BACKGROUND

Music is essential for creating high-quality media content, including movies, films, social media content, advertisements, podcasts, radio shows, and more. The ability to find the right music, or audio sequence, to match companion content is crucial to setting the desired feeling of the media content. Music similarity searching is the task of finding the most similar sounding music recordings to an input audio sequence from within a database of audio content. Given that music can have multiple notions of similarity and musical style can vary dramatically over the course of a song (e.g., changes in mood, instrumentation, tempo, etc.), music similarity searching presents several challenges. For example, if a user searches a catalog of audio sequences to find similar sounding audio sequences, either by inputting keywords or a sample audio sequence, identified results are typically displayed as a list with the ability for the user to play each of the results. However, these systems require the user to manually parse through the identified results to determine portions of the audio sequence that may satisfy the user's needs. This can be a tedious and time-consuming process that may require the user to listen to most or all of each of the identified results to identify the portions matching the user's initial input.

Audio-based music structure analysis, also known as music or audio segmentation, is a challenging task in music information retrieval. The goal of audio-based music structure analysis is to determine a series of non-overlapping segments, or sections, of a piece of music or audio, where each segment is defined by a set of temporal boundaries, and to identify and label which segments are repetitions of each other. The different segments can represent distinct parts of a song, e.g., the intro, chorus, verse, instrumental, bridge, etc., or can represent more granular portions of an audio sequence.

While some existing audio segmentation solutions use handcrafted features to identify different segments of an audio sequence, these handcrafted features can be susceptible to noise, resulting in sub-optimal results.

SUMMARY

Introduced here are techniques/technologies that allow an audio processing system to perform multi-level audio segmentation using deep embeddings. The audio processing system can receive an audio sequence as an input and process the audio sequence using an audio model to generate an audio segmentation representation of the audio sequence. The audio segmentation can identify unique segments within the audio sequence that have different musical qualities, and further identify any repetitions of such unique segments.

In particular, in one or more embodiments, an audio processing system can generate a first set of audio features for each frame of an input audio sequence computed using deep embeddings learned via Few-Shot Learning (FSL) or digital signal processing (DSP) features, such as mel-frequency cepstral coefficients (MFCC) features to identify local similarity between consecutive beats of the audio sequence, and a second set of audio features for each frame of the input audio sequence computed using Constant-Q transform (CQT) features to capture repetition across the entire audio sequence that are combined with DEEPSIM embeddings learned via a music auto-tagging model designed to capture music similarity across genre, mood, tempo, and era. Using the features, the audio processing system identifies and clusters frames of the input audio sequence that are musically similar and assigns a cluster identifier to each frame. The frames can then be arranged into their original order (e.g., via a timestamp associated with each frame), and consecutive frames that are associated with the same cluster identifier can be designated or identified as being a segment of the input audio sequence. Further, non-consecutive segments that have the same cluster identifier can be identified as repetitions of each other, or as being musically similar, and can be designated as such.

In one or more embodiments, the audio processing system generates a multi-level audio segmentation (e.g., 10-12 levels), where the level defines the number of unique clusters. For example, at a first level, all the frames of the audio sequence are assigned to the same cluster based on their features, at a second level, the frames are assigned to one of two clusters based on their features, etc. Thus, at higher levels, the audio sequence is clustered into segments with increasing granularity.

In some embodiments, when the generated multi-level audio segmentation includes segments that are shorter than a defined threshold length (e.g., less than eight seconds), rather than providing the generated audio segmentation with the short segments, the audio processing system fuses the short segments with a neighboring segment based on analyzing the cluster identifiers of the short segment and of neighboring segments at lower levels of the audio segmentation.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
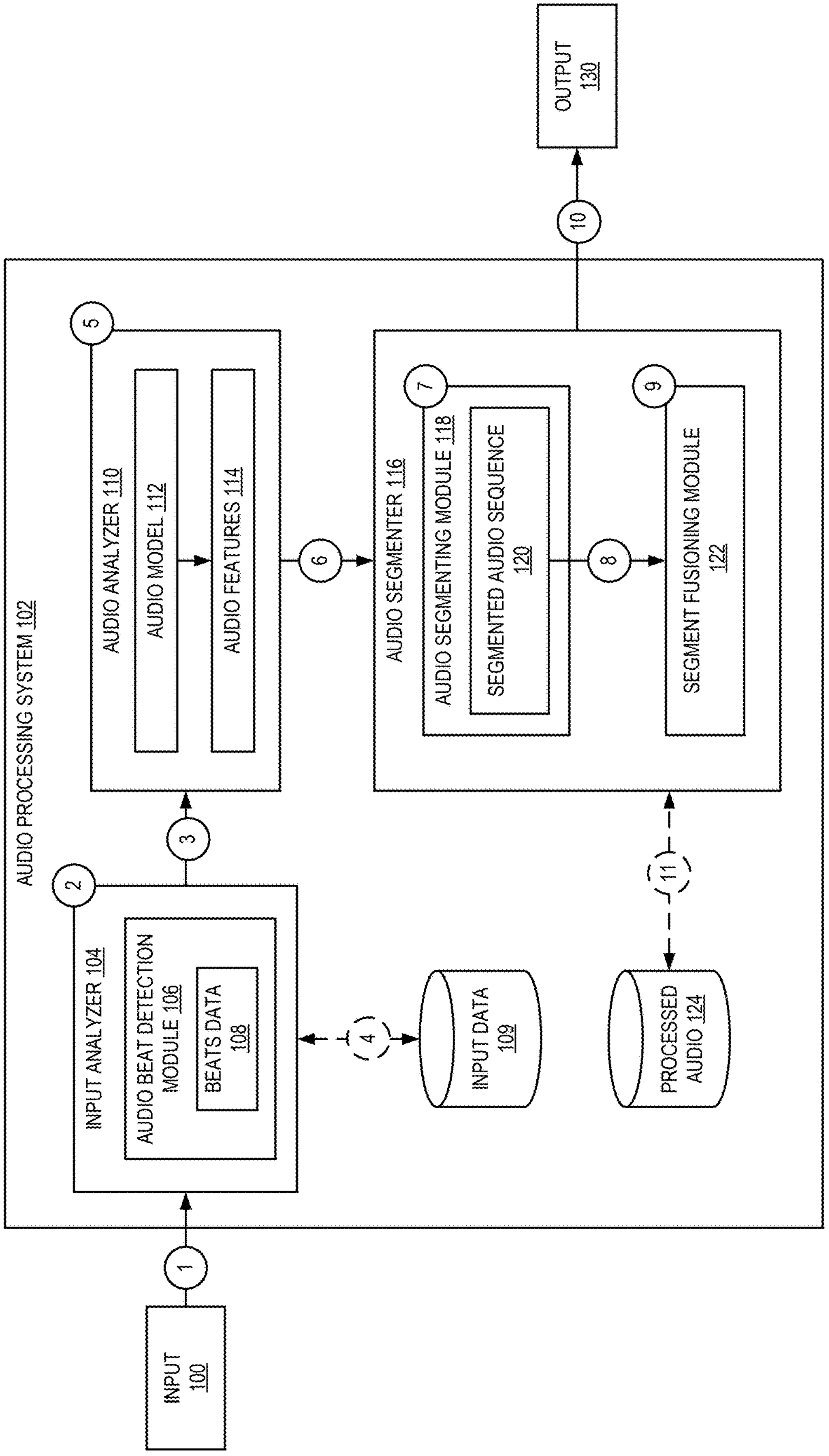
FIG. 1 illustrates a diagram of a process of performing audio segmentation using deep embeddings in accordance with one or more embodiments.

One or more embodiments include an audio processing system configured to perform audio segmentation using deep embeddings to identify the structure of an audio sequence, or other media sequence or music recording, by automatically dividing it into segments and determining which segments repeat and when.

Existing audio segmentation solutions have their limitations and deficiencies in their feature extraction and outputs. First, existing audio segmentation solutions used only DSP features. However, these solutions struggle to capture some types of musical transitions because the DSP features are both sensitive to noise and limited to capturing some aspects of harmony and timbre, but in a constrained way. For example, for an EDM (electronic dance music) audio sequence, where the harmony is similar throughout the audio sequence, DSP features are incapable of capturing changes in the audio sequence because of the musical characteristics captured, resulting in overlooked transitions. Second, because the existing audio segmentation solutions are sensitive to noise, they can result in the creation of short, spurious segments of audio that do not actually represent different musical segments of an audio sequence, and even when they do, they may not be helpful to the end user or application.

The multi-level audio segmentation process addresses the deficiencies of previous solutions. The multi-level audio segmentation process uses deep audio embeddings that are more robust and less sensitive to noise and provide more stable representations of audio sequences. The deep embeddings also capture a broader and complex range of musical characteristics of audio sequences. The improved feature extraction provided by the use of deep embeddings in lieu of and/or in combination with DSP features allows the multi-level audio segmentation process to capture musical transitions that are missed by the previous solutions.

The multi-level audio segmentation process uses deep audio features learned via machine learning, e.g., Few-Shot Learning (FSL), and DSP audio features computed via signal processing, e.g., Constant-Q Transform (CQT) features that are combined with deep embeddings (e.g., DEEP-SIM) learned via a music auto-tagging model designed to capture music similarity across genre, mood, tempo, and era. Using the deep embeddings, audio segmentation is achieved by clustering each frame (e.g., beat) of the audio sequence and assigning each frame a cluster identifier associated with its cluster. Consecutive frames with the same cluster identifier are then grouped to form the various segments of the audio sequence. Segments at distinct parts of the audio sequence that have the same cluster identifier can be identified as being similar segment types. As the desired granularity of the segments may vary by use case, the audio segmentation process produces a multi-level segmentation representation of an input audio sequence, starting from a first level with one segment representing the entire audio sequence to an Nth level with N unique segments, which may repeat.

As the deep embeddings are less sensitive to noise, the audio segmentations generated by the multi-level audio segmentation process can result in the creation of less short segments (e.g., less than eight to ten seconds). To address any short segments that are created, the multi-level audio segmentation process further processes the audio segmentation. The multi-level audio segmentation process eliminates these shorter segments using a multi-level segment fusioning algorithm whereby the short segments in the audio sequence are fused, or merged, with neighboring segments based on analyzing lower levels of the multi-level segmentation representation of the audio sequence.

By performing the multi-level audio segmentation process, the embodiments described herein provide a significant increase in search speed and scalability. For example, the audio segmentation process can be used to process audio sequences in an audio catalog, such that when an input audio sequence is provided, similar sounding audio sequences, and specifically, similar sounding segments of audio sequences in the audio catalog, can be provided as an output. By specifically indicating the specific segments of an audio sequence that matches, the audio segmentation process makes the music searching process more efficient and less time-consuming as it enables a user to immediately audition the most relevant segment/content of each audio sequence in the search result. Another application of the audio segmentation process is allowing a user to quickly locate and extract a segment of a song to use (e.g., to apply to a video sequence, etc.). Further, the audio segmentation process can also be used in a remixing system that allow users to make audio sequences shorter or longer. By segmenting the audio sequences in the manner described herein, such remixing systems can provide the user ability to shorten or lengthen specific segments of the audio sequence.

FIG. 1 illustrates a diagram of a process of performing audio segmentation using deep embeddings in accordance with one or more embodiments. As shown in FIG. 1, in one or more embodiments, an audio processing system 102 receives input 100 as part of a request to segment an audio sequence, as shown at numeral 1. In one or more embodiments, the input 100 includes at least the audio sequence. For example, the audio processing system 102 receives the input 100 from a user via a computing device. In one example, a user may select files including the audio sequence in an application. In another example, a user may submit files including the audio sequence, or information indicating the location of the audio sequence (e.g., file location, URL, etc.), to a web service or an application configured to receive audio sequences as inputs. The audio sequence can also be a portion selected from a longer audio sequence. For example, after providing the audio sequence to the application, the application can present an interface to the user to select a portion of the longer audio sequence. In one or more embodiments, the audio processing system 102 includes an input analyzer 104 that receives the input 100.

In one or more embodiments, the input analyzer 104 analyzes the input 100, as shown at numeral 2. In one or more embodiments, the input analyzer 104 can extract or identify the audio sequence from the input 100. In one or more embodiments, an audio beat detection module 106 analyzes the audio sequence to generate beats data 108. For example, the audio beat detection module 106 can use a beat detection algorithm to parse through the audio sequence, where the beat detect algorithm is configured to identify the timestamps for each beat within the audio sequence.

In one or more embodiments, the input 100 also includes a user-specified segment value, where the segment value indicates a number of unique clusters to divide the audio sequence into. For example, if the segment value is three, the audio sequence will be divided into three unique clusters (which may repeat throughout the audio sequence), where every frame (e.g., beat) of the audio sequence is assigned to one of the three clusters. Larger values for the segment value results in more unique clusters, increasing the granularity of each segment. In one or more embodiments, the user-specified segment value is a segmentation level selection indicating a user preference for the output generated by the audio processing system 102.

After generating the beats data 108 for the audio sequence, the input analyzer 104 sends the beats data 108 to an audio analyzer 110, as shown at numeral 3. In one or more embodiments, the input analyzer 104 stores the audio sequence and the beats data 108 in a memory or storage (e.g., input data 109) for later access by the audio analyzer 110, as shown at numeral 4.

In one or more embodiments, the audio analyzer 110 processes the audio sequence using an audio model 112 to generate audio features 114, as shown at numeral 5. In one or more embodiments, the audio model 112 is a convolutional neural network (e.g., an Inception network) trained to classify audio to generate the audio features 114. In one or more embodiments, a neural network includes deep learning architecture for learning representations of audio. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In one or more embodiments, the audio model 112 extracts features (e.g., a vector of numbers representing the audio sequence) from the input audio sequence that capture information of different musical qualities from the audio sequence. The features can be signal processing transformations of the audio sequence and/or the output of a neural network. In some embodiments, the audio model 112 extracts a sequence of features from the audio sequence, where the sequence of features is computed at a high temporal resolution (e.g., 100 feature frames per second). The audio analyzer 110 then uses the beats data 108 to aggregate the features spanning a single beat, resulting in a feature vector for each beat. For example, if the beats data 108 for an audio sequence indicates that there are 500 beats across the audio sequence, the audio features 114 will include a feature vector for each of the 500 beats. For example, the DEEPSIM neural network produces a vector of 256 values, divided into four subsets of 64 values, where each subset captures one of four musical characteristics: genre, mood, tempo, and era. The QCT features are also a vector of values, which capture harmony, timbre, etc.

In one or more embodiments, a recurrence matrix captures the similarity between feature frames of an audio sequence to expose the song structure. It is a binary, squared, symmetrical matrix, R, such that $R_{ij}=1$ if frames i and j are similar for a specific metric, e.g., cosine distance, and $R_{ij}=0$ otherwise. In one or more embodiments, a frame of the audio sequence is a beat derived from the beats data 108.

The recurrence matrix, R, can be obtained by combining, or fusing, two recurrence matrices obtained from audio features: (1) $R^{loc}$, computed using deep embeddings learned via Few-Shot Learning (FSL), or MFCC features computed via DSP, to identify local similarity between consecutive beats of the audio sequence; and (2) $R^{rep}$, computed using Constant-Q transform (CQT) features to capture repetition across the entire audio sequence that are combined with DEEPSIM embeddings learned via a music auto-tagging model designed to capture music similarity across genre, mood, tempo, and era. $R^{loc}$ can be used to detect sudden sharp changes in timbre, while $R^{rep}$ can be used to capture long-term harmonic repetition. The matrices can be combined via a weighted sum controlled by a hyper-parameter $\mu\in[0, 1]$, which can be set manually or automatically. The result can be expressed as the following:

$$R=\mu R^{rep}+(1-\mu)R^{loc}$$

The recurrence matrix, R, can be an unweighted, undirected graph, where each frame is a vertex and 1's in the recurrence matrix represent edges.

FSL is an area of machine learning that trains models that, once trained, are able to robustly recognize a new class given a handful of examples of the new class at inference time. In one or more embodiments, Prototypical Networks are used to embed audio such that perceptually similar sounds are also close in the embedding space. As such, these embeddings, which are computed from a time window (e.g., 0.5 seconds), can be viewed as a general-purpose, short-term, timbre similarity feature. By capturing local, short-term timbre similarity, sharp transitions can be identified as potential boundary locations. In some embodiments, when it is not possible to compute the FSL features, digital signal processing (DSP) can be used to compute mel-frequency cepstral coefficients (MFCC) features.

CQT features can be computed from an audio signal via the Constant-Q Transform. In one or more embodiments, Harmonic-Percussive Source Separation (HPSS) is applied to enhance the harmonic components of the audio signal. The CQT features are combined with deep audio embeddings that can capture other complementary music qualities that may be indicative of repetition, such as instrumentation, tempo, and mode. In one or more embodiments, using a disentangled multi-task classification learning yields embeddings having the best music retrieval results. In such embodiments, disentangled refers to the embedding space being divided into sub-spaces that capture different dimensions of music similarity. The full embedding of size 256 is divided into four disjoint subspaces, each of size 64, where each subspace captures similarity along one musical dimension: genre, mood, tempo, and era. The deep audio embeddings, which are obtained from a 3-second context window and trained on a music tagging dataset, can capture musical qualities that can be complementary to those captured by CQT. For example, genre is often a reasonable proxy for instrumentation; mood can be a proxy for tonality and dynamics; tempo is an important low-level quality in itself; and era, in addition to being related to genre, can be indicative of mixing and mastering effects. Combined, the full embedding, referred to as DEEPSIM, may surface repetitions along dimensions that are not captured by the CQT alone.

In one or more embodiments, the matrices are combined via a weighted sum controlled by hyper-parameters $\mu\in[0, 1]$ and $\gamma \in [0, 1]$, which can be set manually or automatically, and can be expressed using the following equation:

$$R=\mu(\gamma R^{DEEPSIM}+(1-\gamma)R^{CQT})+(1-\mu)R^{FSL}$$

where μ controls the relative importance of local versus repetition similarity, while γ controls the relative importance of CQT versus DEEPSIM features for repetition similarity. The three matrices are normalized prior to being combined to ensure their values are in the same [0, 1] range. In one or more embodiments, the initial parameterizations are set to $\mu=0.5$, $\gamma=0.5$, which gives equal weight to local similarity obtained via FSL features and repetition similarity given by the simple average of the $R^{CQT}$ and $R^{DEEPSIM}$ matrices.

After generating the audio features 114 for the audio sequence, the audio analyzer 110 sends the audio features 114 to an audio segmenter 116, as shown at numeral 6. The audio segmenting module 118 is configured to generate a segmented audio sequence using the audio features 114, as shown at numeral 7. In one or more embodiments, spectral clustering is applied to the recurrence matrix, resulting in a per-beat cluster assignment. Segments are derived by grouping frames (e.g., beats) of the audio sequence by their cluster assignment. For example, the audio segmenting module 118 places each frame of the audio sequence into one of a plurality of clusters based on the extracted features, where frames that are in the same cluster have similar musical qualities. Each of the frames can then be assigned a cluster identifier corresponding to its assigned cluster, and the frames can then be arranged in their original order (e.g., based on their corresponding timecodes). The audio segmenting module 118 can then identify different segments of the audio sequence based on the cluster identifiers assigned to each frame. For example, the first 30 frames of the audio sequence may be assigned the same first cluster identifier indicating that they are all part of a first segment, the next 20 frames may be assigned the same second cluster identifier indicating that they are all part of a second segment, and so on. Non-consecutive segments that include frames assigned with the same cluster identifier represent a repetition within the audio sequence. For example, if the next 30 frames representing a third segment are assigned the same cluster identifier as the first segment, the first and third segments can be considered musically similar (e.g., repetitions having similar musical qualities).

Figure 2:
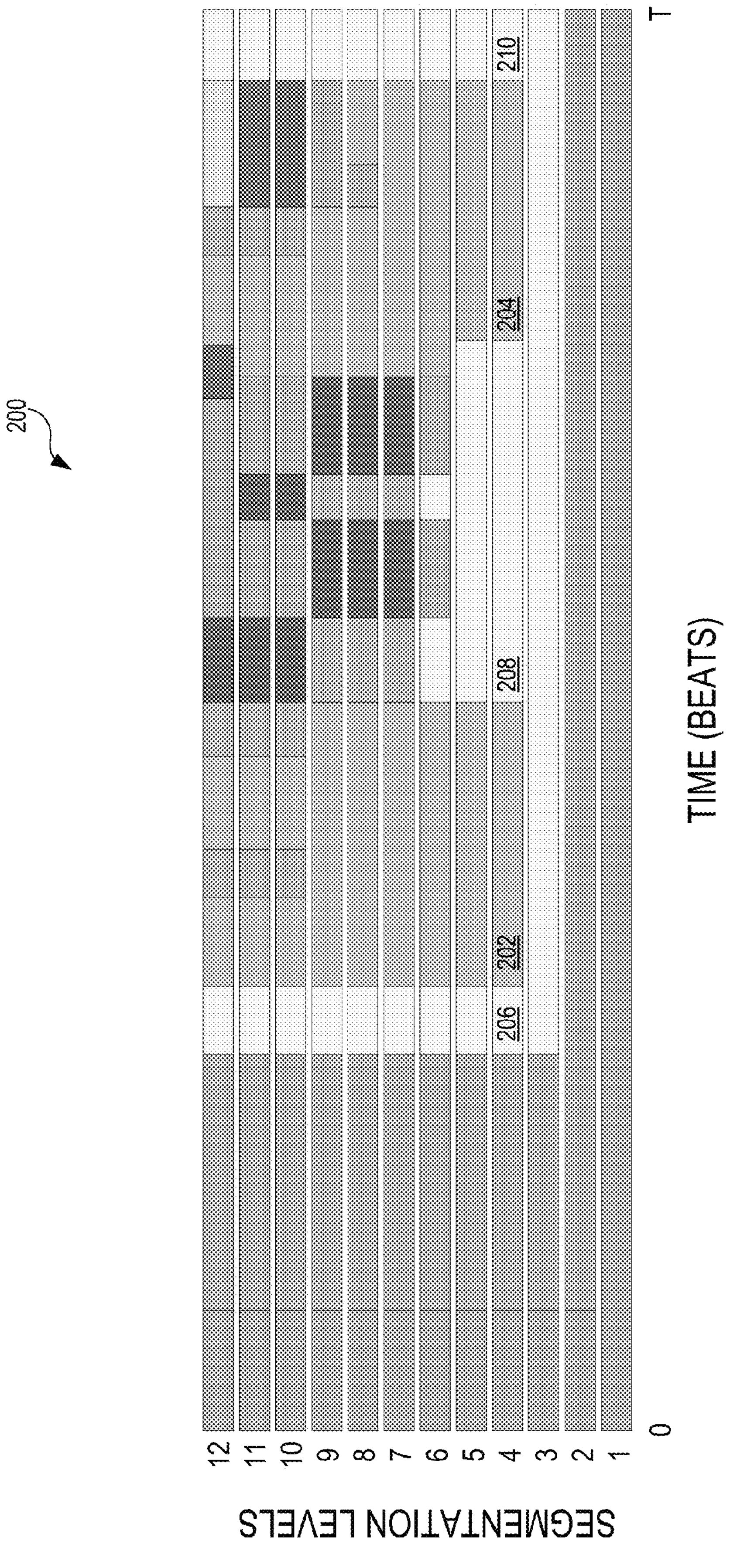
FIG. 2 illustrates an example multi-level audio segmentation representation of an audio sequence generated by an audio segmentation process using deep embeddings in accordance with one or more embodiments.

In one or more embodiments, while the audio processing system 102 generates an output that includes an audio segmentation with a number of unique segments matching the user-specified segment value (e.g., received in the input 100 or at a later time), the audio processing system 102 generates a multi-level audio segmentation for the audio sequence. For example, the audio processing system 102 may generate 10-12 levels of audio segmentation for an input audio sequence, while only providing an audio segmentation at level three as the output. FIG. 2 illustrates an example multi-level audio segmentation representation of an audio sequence generated by an audio segmentation process using deep embeddings in accordance with one or more embodiments. In FIG. 2, multi-level audio segmentation 200 includes a set of 12 segmentation levels for an audio sequence from time zero to T (in beats) with unique segments (indicated by different colors) representing different identified portions of the audio sequence. As the audio processing system 102 increases the number of unique segments the audio sequence is divided into, each successive level of the audio segmentation represents the audio sequence with increasing granularity. The first level of multi-level audio segmentation 200 depicts the beats of the audio sequence in a single segment, the second level depicts the beats divided into two unique segments, and so on. In one or more embodiments, in practice, each successive level of the multi-level audio segmentation will divide the audio sequence into additional unique segments, prior to a segment fusioning process, described later herein. The fourth level depicts beats divided into four unique segment types, indicated by the four different colored segments, and also illustrates segments that the audio processing system 102 has determined to be musically similar and/or repetitions of each other. For example, segments 202 and 204 are represented by the same color based on being determined to be musically similar, while segments 206, 208, and 210 are musically similar.

The number of unique segments produced by the segmentation is equal to the number of clusters N used for spectral clustering. In one or more embodiments, spectral clustering with increasing $N=1 \ldots M$ results in a multi-level audio segmentation of M levels, where the larger the value of M, the finer the resulting segmentations at the higher levels. The spectral clustering uses an eigenvalue decomposition, such that for a given M, the data is projected onto the first M eigenvectors (ordered by their eigenvalues) of the symmetrical normalized Laplacian of R and then clustered. The same eigenvectors are reused for increasing M (each time adding one more), meaning cluster assignments at different levels are related.

In one or more embodiments, when the segmented audio sequence 120 includes short segments (e.g., shorter than a threshold length, such as eight to ten seconds), the segmented audio sequence 120 is sent to a segment fusioning module 122, as shown at numeral 8. Otherwise, if the segmented audio sequence 120 does not include any short segments, the audio segmenter 116 can provide the segmented audio sequence 120 as output, as shown at numeral 10.

The segment fusioning module 122 is configured to modify the segmented audio sequence 120, as illustrated at numeral 9. In one or more embodiments, the segment fusioning module 122 identifies a subset of the identified segments of the segmented audio sequence 120 that have a duration less than a threshold duration. In one or more embodiments, the threshold duration can be a user-specified value. In other embodiments, the threshold duration can be automatically determined based on characteristics of the audio sequence 120. In such embodiments, the segmented audio sequence 120 performs a segment fusioning process. If the segmented audio sequence 120 does not contain any segments have durations less than the duration threshold, the segment fusioning module 122 does not process the segmented audio sequence 120 any further.

In the segment fusioning process, the segment fusioning module 122 merges each identified segment having a duration less than the threshold duration with a neighboring segment. These smaller, or shorter, segments may be generated in the segmentation process but may not represent distinct segments in the song and/or may not be of a length suitable for the needs of end users.

Figure 3:
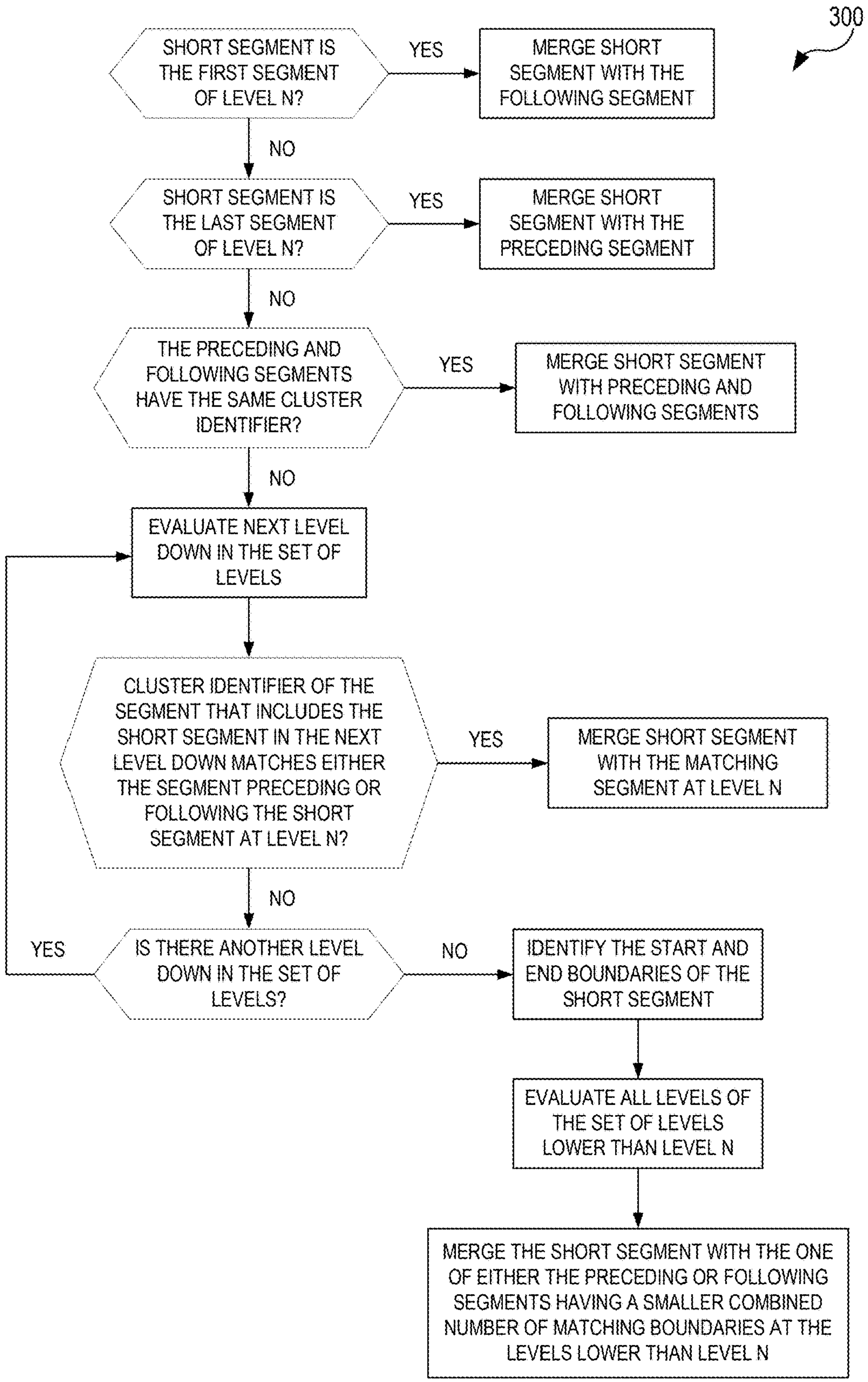
FIG. 3 illustrates a flowchart of a series of acts in a method of performing a segment fusioning process for a segmented audio sequence in accordance with one or more embodiments.
Figure 4:
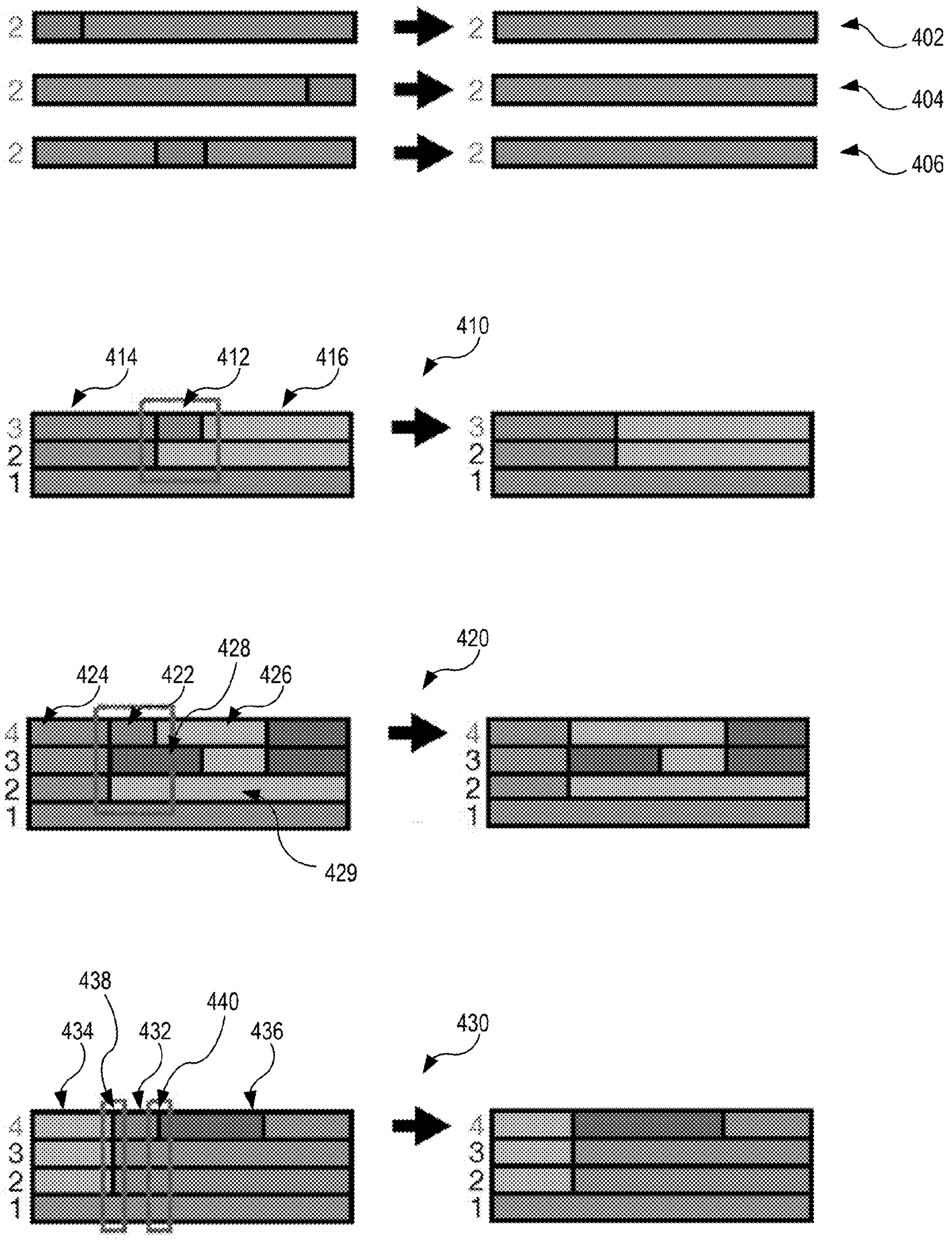
FIG. 4 illustrates examples of the segment fusioning process in accordance with one or more embodiments.

FIG. 3 illustrates a flowchart 300 of a series of acts in a method of performing a segment fusioning process for a segmented audio sequence in accordance with one or more embodiments. The method is described with respect to a short segment at level N of a multi-level audio segmentation. FIG. 4 illustrates examples of the segment fusioning process in accordance with one or more embodiments. In one or more embodiments, the segment fusioning process determines if the short segment is the first segment of level N. If the short segment is the first segment of level N of the segmented audio sequence, the short segment is merged with the following segment of level N of the segmented audio sequence, as shown in example 402 of FIG. 4. If the short segment is not the first segment of level N of the segmented audio sequence, the segment fusioning process determines if the short segment is the last segment of level N. If the short segment is the last segment of level N of the segmented audio sequence, the short segment is merged with the preceding segment of level N of the segmented audio sequence, as shown in example 404 of FIG. 4. If the short segment is not the last segment of level N of the segmented audio sequence, the segment fusioning process determines if the short segment is in the middle of the segmented audio sequence and both the segments preceding and following the short segment have the same cluster identifier. If the segments preceding and following the short segment have the same cluster identifier, the short segment is merged with the preceding segment and the following segment to form a single segment, as shown in example 406 of FIG. 4.

Returning to FIG. 3, in one or more embodiments, where the short segment cannot be merged with another segment based on the evaluation of the level on which the short segment is located (e.g., the short segment is not the first segment, last segment, or between two segments with the same cluster identifier), the segment fusioning process evaluates a next level down in the segmented audio sequence (e.g., level (N−1)). If the cluster identifier of the segment that includes the short segment at level (N−1) matches the cluster identifier of either the preceding or following segments at level N, the segment fusioning module 122 merges the short segment with the matching segment at level N. As illustrated in example 410, the short segment 412 is located in level 3 and is between preceding segment 414 and following segment 416. The segment fusioning module 122 evaluates level 2 to determine the cluster identifier of the short segment 412 in level 2. In this example, because the cluster identifier for the segment in level 2 that includes the short segment 412 is the same as following segment 416 in level 3, the short segment 412 is merged with the following segment 416 in level 3.

Returning to FIG. 3, if the short segment cannot be merged with another segment based on the evaluation of level (N−1) (e.g., if the cluster identifier of the segment of level (N−1) that includes the short segment does not match the cluster identifier of either the preceding segment or the following segment at level N), the segment fusioning module 122 evaluates the next level down in the set of levels (e.g., level (N−2)), and so on, until the segment fusioning module 122 finds a segment whose cluster identifier matches the cluster identifier of either the previous or next segment at level N. As illustrated in example 420, the short segment 422 is located in level 4 and is surrounded by preceding segment 424 and following segment 426. The segment fusioning module 122 evaluates level 3 to determine the cluster identifier of the short segment 422 in level 3. In this example, because the cluster identifier for the segment containing the short segment in level 3 (e.g., segment 428) is a different cluster identifier from both previous segment 424 and next segment 426, segment fusioning module 122 evaluates level 2 (e.g., level N−2). In this example, because the cluster identifier for the segment in level 2 that includes the short segment 422 (e.g., segment 429) is the same as following segment 426 in level 4, the short segment 422 is merged with the next segment 426 in level 4.

Returning to FIG. 3, if the segment fusioning module 122 reaches the bottom level (e.g., level 1) and does not identify a match, the segment fusioning process determines how to merge the small segment based on the boundaries of the small segment. Each small segment has a "start" boundary and an "end" boundary. The segment fusioning process identifies a timestamp associated with the "start" and "end" boundaries of the short segment. For each boundary, segment fusioning module 122 evaluates all of the levels of the set of levels lower than level N. The section fusioning module 122 counts the combined number of "start" and "end" boundaries that overlap with the "start" and "end" boundaries of the short segment at all lower segmentation levels, where boundaries at different levels are considered as overlapping when they are within a threshold time of each other (e.g., one second). In this situation, whichever of the "start" or "end" boundaries of the short segment overlaps with the most boundaries at the lower segmentation levels is treated as a "real" boundary and the other boundary is treated as a "losing" boundary. The "losing" boundary is removed by merging the short segment to the segment that was separated from the short segment by the "losing" boundary. As illustrated in example 430, the short segment 432 is located in level 4 and is surrounded by preceding segment 434 and following segment 436. As the segment fusioning module 122 cannot find a match using the methods described with respect to the previous examples, the segment fusioning module 122 evaluates the start boundary 438 and the end boundary 440 of short segment 432 at the lower levels of the audio segmentation. Based on the evaluation, the segment fusioning module 122 determines that the start boundary 438 at level 4 is consistent with two lower levels (levels 2 and 3), whereas the end boundary 440 at level 4 is not consistent with any boundaries at the lower levels. Based on this determination, the segment fusioning module 122 treats the start boundary 438 as a real boundary and the end boundary 440 is removed by merging the short segment 432 with the following segment 436 in level 4.

The segment fusioning process is performed for each segment shorter than the duration threshold until there are no short segments left at level n. In one or more embodiments, the segment fusioning module 122 iterates over the segments in a double loop process. The outer loop iterates over segment identifiers, from the highest to the lowest, where the segment identifiers correspond to the eigenvector to which the segment was clustered. By iterating in this manner, the segment fusioning module 122 is more likely to keep segments with lower identifiers, which in turn are more likely to appear at lower levels of the set of levels. Within each segment identifier, the inner loop iterates over the segments from shortest to longest.

Returning to FIG. 1, the output 130 of the segment fusioning module 122 can then be provided, as shown at numeral 10. In one or more embodiments, the audio processing system 102 provides an output 130, including the segmented audio sequence 120, as shown at numeral 10. In one or more embodiments, after the process described above in numerals 1-9 the output 130 is sent to the user or computing device that initiated the audio segmentation process with the audio processing system 102, to another computing device associated with the user or another user, or to another system or application. For example, after the process described above in numerals 1-10, the segmented audio sequence 120 can be displayed in a user interface of a computing device.

Figure 5:
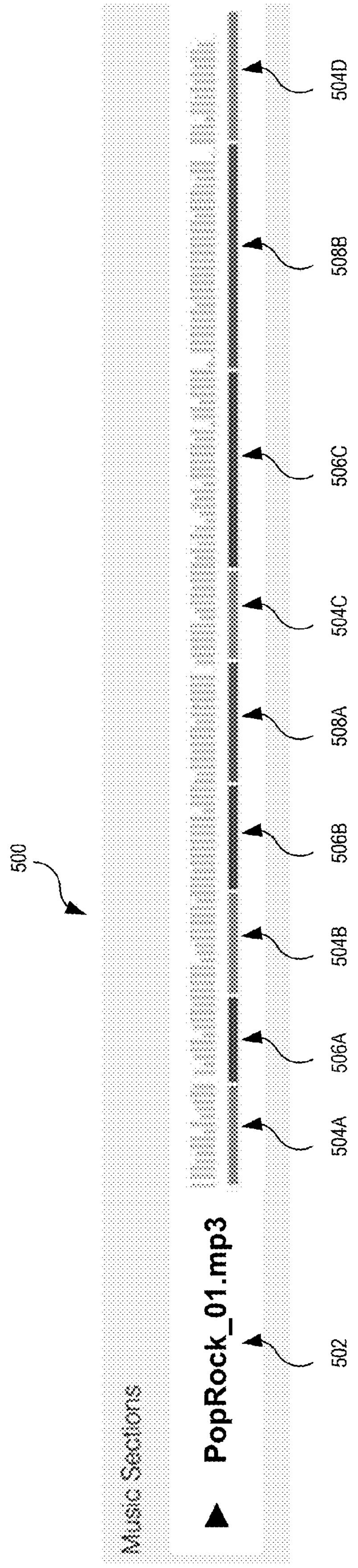
FIG. 5 illustrates an example output segmentation of an audio sequence in accordance with one or more embodiments.

FIG. 5 illustrates an example output segmentation of an audio sequence in accordance with one or more embodiments. As illustrated in FIG. 5, an output 500 of the audio processing system (e.g., audio processing system 102)

depicts an audio sequence 502, titled, "PopRock_01.mp3," that has been segmented into a plurality of segments. The output 500 depicts the audio sequence 502 segmented into nine segments, where segments 504A, 504B, 504C, and 504D are a first set of non-consecutive segments having the same or similar musical qualities, segments 506A, 506B, and 506C are a second set of non-consecutive segments having the same or similar musical qualities, and segments 508A and 508B are a third set of non-consecutive segments having the same or similar musical qualities. In one or more embodiments, the output 130 can also be stored in a storage or memory location (e.g., processed audio 124), as shown at numeral 11.

Figure 6:
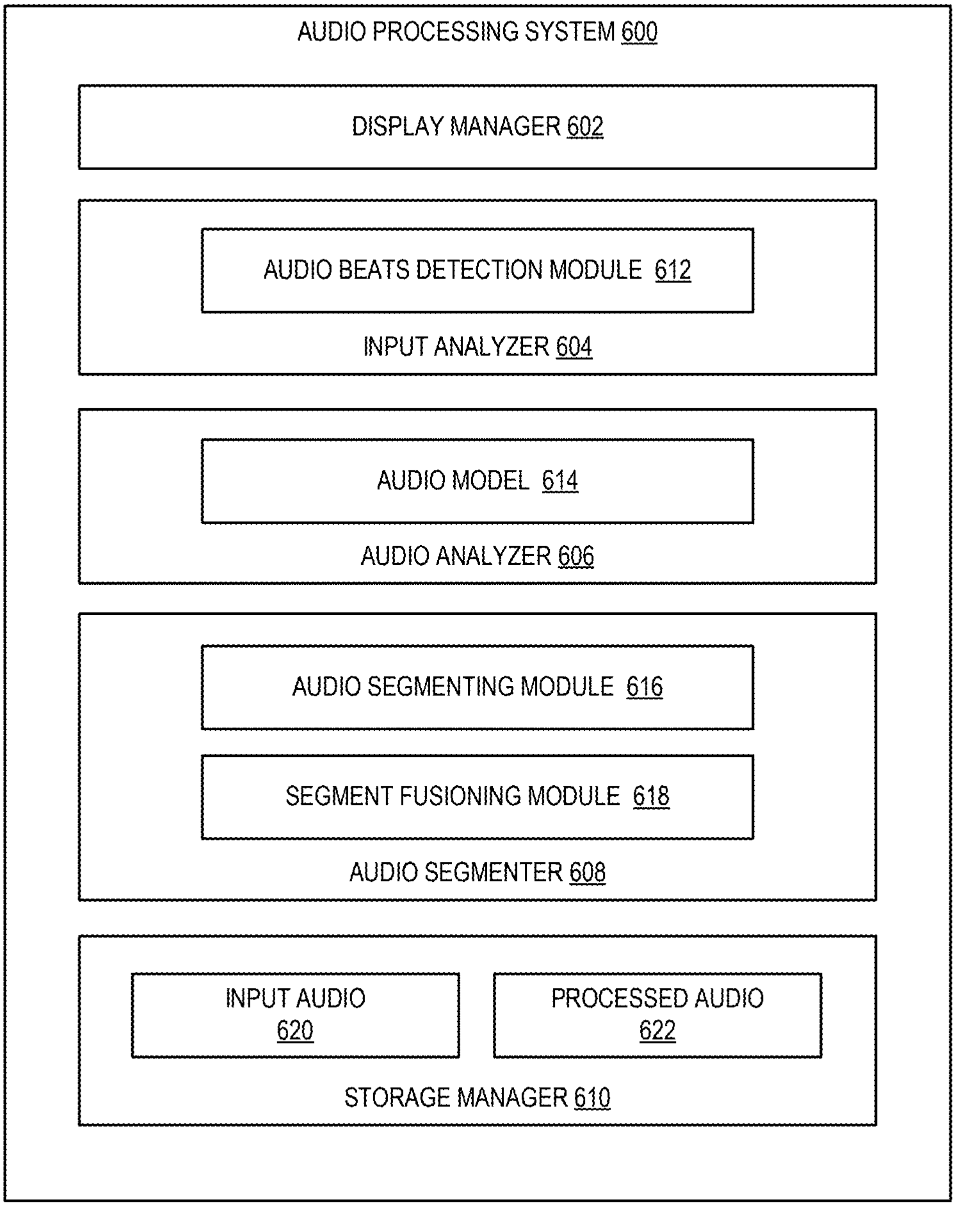
FIG. 6 illustrates a schematic diagram of an audio processing system in accordance with one or more embodiments.

FIG. 6 illustrates a schematic diagram of an audio processing system (e.g., "audio processing system" described above) in accordance with one or more embodiments. As shown, the audio processing system 600 may include, but is not limited to, a display manager 602, an input analyzer 604, an audio analyzer 606, and an audio segmenter 608, and a storage manager 610. As shown in FIG. 6, the input analyzer 604 includes an audio beats detection module 612, the audio analyzer 606 includes an audio model 614, and the audio segmenter 608 includes an audio segmenting module 616 and a segment fusioning module 618. As shown, the storage manager 610 includes input audio 620 and processed audio 622.

As illustrated in FIG. 6, the audio processing system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the audio processing system 600 also includes an input analyzer 604. The input analyzer 604 analyzes an input received by the audio processing system 600 to identify an input audio sequence, and if provided in the input, a user-specified segment value, where the segment value indicates a number of unique clusters to divide the audio sequence into. In one or more embodiments, the input analyzer 604 extracts the input audio sequence from the input and further analyzes the audio sequence using the audio beats detection module 612. The audio beats detection module 612 can analyze the input audio sequence and generate beats data that represents the input audio sequence at the beat level, where each frame of the input audio sequence is a beat.

As further illustrated in FIG. 6, the audio processing system 600 also includes an audio analyzer 606 configured to generate audio embeddings for input audio sequences. The audio analyzer 606 can be implemented as, or include, one or more machine learning models, such as a neural network or a deep learning model. For example, the audio analyzer 606 can include an audio model 614 configured to generate audio features for each frame of an audio sequence. In one or more embodiments, the audio model 614 is a convolutional neural network (e.g., an Inception network) trained to classify audio to generate the audio features.

As further illustrated in FIG. 6, the audio processing system 600 also includes an audio segmenter 608. In one or more embodiments, the audio segmenter 608 includes an audio segmenting module 616 configured to use the data from the audio analyzer 606 to generate an audio segmentation representing of input audio sequences. The audio segmentation can be multi-level, where each level of the multi-level audio segmentation represents an audio sequence with increasing granularity via representing the audio sequence with an increasing number of unique segments. For example, a first level divides the frames (e.g., beats) of an audio sequence into a single cluster, while a tenth level divides the frames of the audio sequence into ten unique clusters. In one or more embodiments, the audio segmenter 608 also includes a segment fusioning module 618 configured to modify the segmented audio sequence generated by the audio segmenting module. The segment fusioning module 618 can identify a subset of the segments of the segmented audio sequence that have a duration less than a threshold duration (e.g., eight seconds, ten seconds, etc.), and determine how each of the short segments in the subset is to be fused or merged with neighboring segments based on an analysis of levels of the audio segmentation.

As further illustrated in FIG. 6, the storage manager 610 includes input audio 620 and processed audio 622. In particular, the input audio 620 may include an input audio sequence received by the audio processing system 600. In one or more embodiments, the input analyzer 604 stores the input audio sequence or information associated with the input audio sequence (e.g., beats data) in the input audio 620 instead of, or in addition to, sending the data to the audio analyzer 606. The processed audio 622 may include the audio segmentation generated by the audio processing system 600, including the cluster identifier associated with each frame (e.g., beat) of an audio sequence to allow the audio sequence to be represented a series of segments.

Each of the components 602-610 of the audio processing system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components as may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the audio processing system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the audio processing system 600 may, for example, be implemented as one or more stand-alone applications, as one or more modules of an application, as one or more plug-ins, as one or more library functions or functions that may be called by other applications, and/or as a cloud-computing model. Thus, the components 602-610 of the audio processing system 600 may be implemented as a stand-alone application, such as a desktop or mobile application. Furthermore, the components 602-610 of the audio processing system 600 may be implemented as one or more web-based applications hosted on a remote server. Alternatively, or additionally, the components of the audio processing system 600 may be implemented in a suit of mobile device applications or "apps." To illustrate, the components of the audio processing system 600 may be implemented in a document processing application or an image processing application, including but not limited to ADOBE® Premiere Pro, ADOBE® Premiere Rush, ADOBE® Audition CC, and ADOBE® Stock Audio, ADOBE® Premiere Elements, etc., or a cloud-based suite of applications such as CREATIVE CLOUD®. "ADOBE®," "ADOBE PREMIERE®," and "CREATIVE CLOUD®" are either a registered trademark or trademark of Adobe Inc. in the United States and/or other countries.

Figure 7:
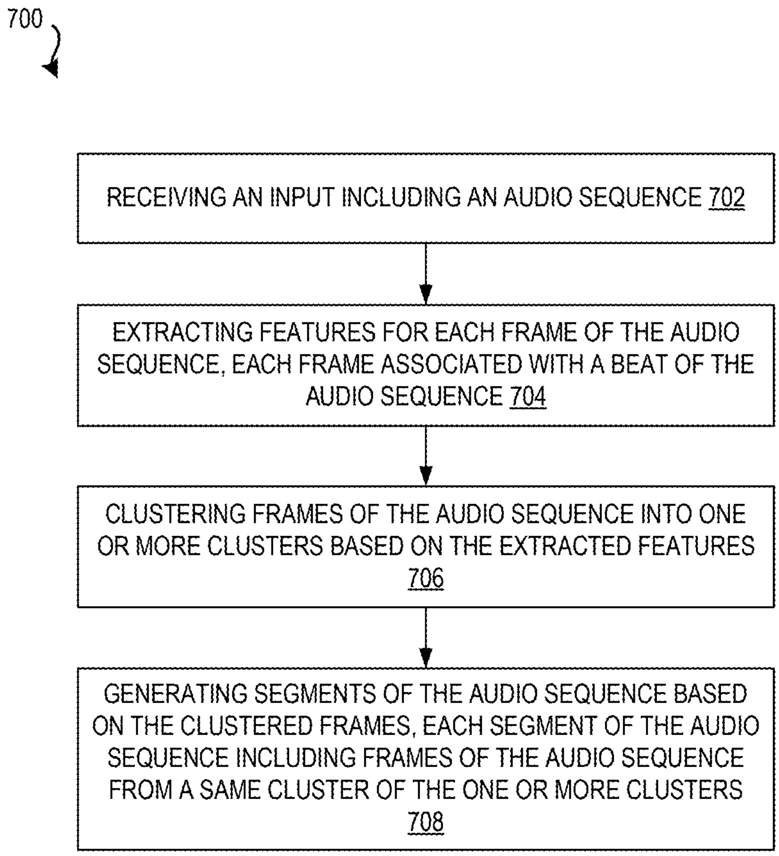
FIG. 7 illustrates a flowchart of a series of acts in a method of performing segmentation of an audio sequence using deep embeddings in accordance with one or more embodiments.

FIGS. 1-6, the corresponding text, and the examples, provide a number of different systems and devices that allow an audio processing system to segment an audio sequence using deep embeddings. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of performing segmentation of an audio sequence using deep embeddings in accordance with one or more embodiments. In one or more embodiments, the method 700 is performed in a digital medium environment that includes the audio processing system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving an input including an audio sequence. The audio sequence can be provided as part of a request to generate an audio segmentation representation of the audio sequence. In one or more embodiments, the audio processing system receives the input from a user (e.g., via a computing device). In one or more embodiments, the user may select the audio sequence in an application, or the user may submit the audio sequence to a web service or an application configured to receive inputs. The audio sequence can also be a portion selected from a longer audio sequence. For example, after providing the audio sequence to the application, the application can provide an interface to enable the user to select a portion of the longer audio sequence.

As shown in FIG. 7, the method 700 also includes an act 704 of extracting features for each frame of the audio sequence, each frame associated with a beat of the audio sequence. In one or more embodiments, the audio processing system extracts beats data from the audio sequence, where each beat of the audio sequence represents a frame. In one or more embodiments, the audio processing system includes an audio analyzer that processes the audio sequence using an audio model to generate audio features. In one or more embodiments, the audio model is a convolutional neural network (e.g., an Inception network) trained to classify audio to generate the audio features. The audio model can extract features (e.g., signal processing transformations of the audio sequence) from the audio sequence that capture information of different musical qualities from the audio sequence. For example, features can capture harmony, timbre, etc. The audio analyzer can then aggregate features that are associated with the same beat, using beats data, to generate a feature vector for that beat (e.g., frame). Thus, if the beats data includes 500 beats across the audio sequence, the audio model will generate a feature vector for each of the 500 beats. In one or more embodiments, the extracted features can be represented in a recurrence matrix generated from fusing together two recurrence matrices obtained from audio features: (1) $R^{loc}$, computed using deep embeddings learned via Few-Shot Learning (FSL) to identify local similarity between consecutive beats of the audio sequence; and (2) $R^{rep}$, computed using Constant-Q transform (CQT) features to capture repetition across the entire audio sequence that are combined with DEEPSIM embeddings learned via a music auto-tagging model designed to capture music similarity across genre, mood, tempo, and era.

As shown in FIG. 7, the method 700 also includes an act 706 of clustering frames of the audio sequence into one or more clusters based on the extracted features. Each frame is assigned to a single cluster of the one or more clusters. In one or more embodiments, spectral clustering is applied to the recurrence matrix, resulting in a per-beat cluster assignment. For example, the audio segmenting module clusters the frames (e.g., beats) of the audio sequence into one or more clusters based on the extracted features, where frames assigned to the same cluster exhibit similar musical qualities as indicated by having similar extracted features. Each of the frames can then be assigned a cluster identifier corresponding to its assigned cluster.

As shown in FIG. 7, the method 700 also includes an act 708 of generating segments of the audio sequence based on the clustered frames, each segment of the audio sequence including frames of the audio sequence from a same cluster of the one or more clusters. In one or more embodiments, the audio segmenting module generates the different segments of the audio sequence based on the cluster identifiers assigned to each frame. For example, the first 30 frames of the audio sequence may be assigned the same first cluster identifier indicating that they are all part of a first segment, the next 20 frames may be assigned the same second cluster identifier indicating that they are all part of a second segment, and so on. Non-consecutive segments that include frames assigned with the same cluster identifier represent a repetition within the audio sequence. For example, if the next 30 frames representing a third segment are assigned the same cluster identifier as the first segment, the first and third segments can be considered musically similar (e.g., repetitions having similar musical qualities).

In one or more embodiments, after generating the segments of the audio sequence based on the clustered frames, the audio segmenting module generates an audio segmentation representation of the audio sequence based on the generated segments. In one or more embodiments, the audio processing system can display the audio segmentation representation of the audio sequence in a user interface. For example, the audio segmentation representation of the audio sequence can be presented on a user interface on the user computing device that submitted the request to perform the audio segmentation. In one or more embodiments, the output includes a single level of the multi-level audio segmentation of the audio sequence, where the level provided as output is based on a user selection of a particular level of the multi-level audio segmentation.

Figure 8:
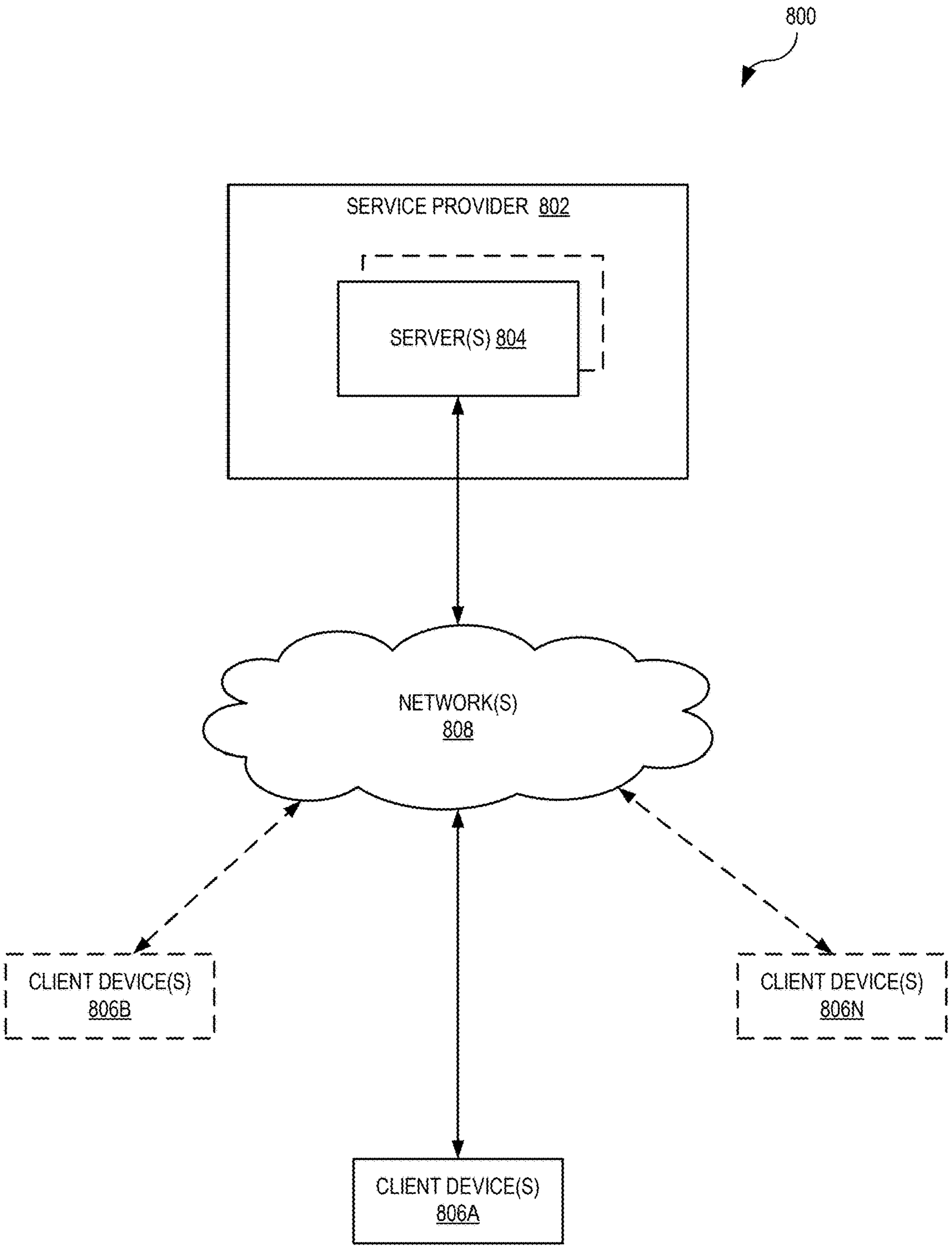
FIG. 8 illustrates a schematic diagram of an exemplary environment in which the audio processing system can operate in accordance with one or more embodiments.

FIG. 8 illustrates a schematic diagram of an exemplary environment 800 in which the audio processing system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the audio processing system 600. In particular, the audio processing system 600 may be implemented in whole or in part on the client device 802A.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including input audio 620, processed audio 622, or other information. For example, a server 804 may receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the audio processing system 600. In particular, the audio processing system 600 can comprise an application running on the one or more servers 804 or a portion of the audio processing system 600 can be downloaded from the one or more servers 804. For example, the audio processing system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide an input (e.g., an audio sequence). Upon receiving the input, the one or more servers 804 can automatically perform the methods and processes described above to generate an audio segmentation of the input audio sequence. The one or more servers 804 can provide an output including the generated audio segmentation to the client device 806A for display to the user.

As just described, the audio processing system 600 may be implemented in whole, or in part, by the individual elements 802-808 of the environment 800. It will be appreciated that although certain components of the audio processing system 600 are described in the previous examples with regard to particular elements of the environment 800, various alternative implementations are possible. For instance, in one or more embodiments, the audio processing system 600 is implemented on any of the client devices

806A-N. Similarly, in one or more embodiments, the audio processing system 600 may be implemented on the one or more servers 804. Moreover, different components and functions of the audio processing system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
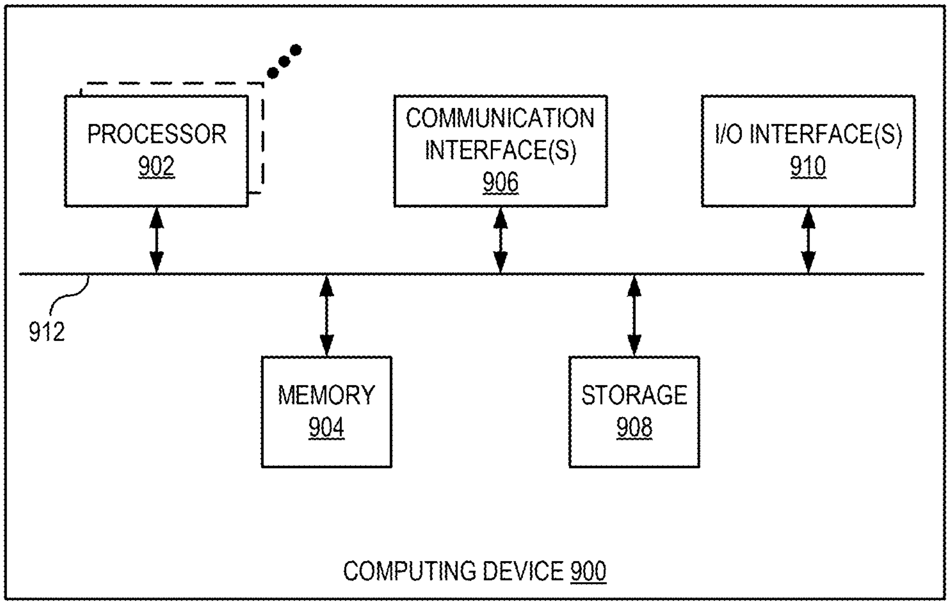
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the audio processing system 600. As shown by FIG. 9, the computing device can comprise a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more input or output ("I/O") devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:

receiving an input including an audio sequence and a first segment value indicating a number of clusters to group frames of the audio sequence into;

extracting features for each frame of the audio sequence, each frame associated with a beat of the audio sequence;

clustering the frames of the audio sequence into one or more clusters based on the extracted features and the first segment value;

generating segments of the audio sequence based on the clustered frames, each segment of the audio sequence formed by grouping consecutive frames of the audio sequence from a same cluster of the one or more clusters; and generating a first representation of the audio sequence using the generated segments of the audio sequence, wherein a subset of the generated segments with durations less than a duration threshold are fused with neighboring segments based on a second representation of the audio sequence generated using a second segment value.

2. The computer-implemented method of claim 1, wherein extracting the features for each frame of the audio sequence comprises:

processing the audio sequence through an audio model trained to extract features for each frame of the audio sequence using deep audio embeddings.

3. The computer-implemented method of claim 1, wherein generating segments of the audio sequence based on the clustered frames comprises:

assigning each frame of the audio sequence a cluster identifier based on the extracted features, wherein frames associated with a same cluster identifier have similar extracted features.

4. The computer-implemented method of claim 1, further comprising:

constructing a multi-level audio segmentation of the audio sequence, wherein each level of the multi-level audio segmentation includes a different number of unique clusters, and wherein the multi-level audio segmentation includes the first representation with a first number of unique clusters based on the first segment value and the second representation with a second number of unique clusters based on the second segment value.

5. The computer-implemented method of claim 4, wherein generating the first representation of the audio sequence using the generated segments of the audio sequence further comprises:

identifying the subset of the generated segments of the audio sequence that have a duration less than the duration threshold; and for each segment of the identified subset of the generated segments, performing a segment fusioning process by merging the segment with a neighboring segment in the first representation based on cluster assignments related to the segment and neighboring frames at lower levels of the multi-level audio segmentation of the audio sequence, including the second representation.

6. The computer-implemented method of claim 4, further comprising:

generating an audio segmentation representation of the audio sequence based on the generated segments; and selecting a level of the multi-level audio segmentation as an output based on a segmentation level selection.

7. The computer-implemented method of claim 1, further comprising:

applying a beat detection algorithm to the audio sequence to identify the beats of the audio sequence.

8. The computer-implemented method of claim 1, further comprising:

associating a first segment of the audio sequence with a second segment of the audio sequence when the first segment and the second segment include frames from a same first cluster of the one or more clusters.

9. A non-transitory computer-readable storage medium including instructions stored thereon which, when executed by at least one processor, cause the at least one processor to:

receive an input including an audio sequence and a first segment value indicating a number of clusters to group frames of the audio sequence into;

extract features for each frame of the audio sequence, each frame associated with a beat of the audio sequence;

cluster the frames of the audio sequence into one or more clusters based on the extracted features and the first segment value;

generate segments of the audio sequence based on the clustered frames, each segment of the audio sequence formed by grouping consecutive frames of the audio sequence from a same cluster of the one or more clusters; and generate a first representation of the audio sequence using the generated segments of the audio sequence, wherein a subset of the generated segments with durations less than a duration threshold are fused with neighboring segments based on a second representation of the audio sequence generated using a second segment value.

10. The non-transitory computer-readable storage medium of claim 9, wherein to extract the features for each frame of the audio sequence, the instructions, when executed, further cause the at least one processor to:

process the audio sequence through an audio model trained to extract features for each frame of the audio sequence using deep audio embeddings.

11. The non-transitory computer-readable storage medium of claim 9, wherein to generate segments of the audio sequence based on the clustered frames, the instructions, when executed, further cause the at least one processor to:

assign each frame of the audio sequence a cluster identifier based on the extracted features, wherein frames associated with a same cluster identifier have similar extracted features.

12. The non-transitory computer-readable storage medium of claim 9, wherein the instructions, when executed, further cause the at least one processor to:

construct a multi-level audio segmentation of the audio sequence, wherein each level of the multi-level audio segmentation includes a different number of unique clusters, and wherein the multi-level audio segmentation includes the first representation with a first number of unique clusters based on the first segment value and the second representation with a second number of unique clusters based on the second segment value.

13. The non-transitory computer-readable storage medium of claim 12, wherein to generate the first representation of the audio sequence using the generated segments of the audio sequence, the instructions, when executed, further cause the at least one processor to:

identify the subset of the generated segments of the audio sequence that have a duration less than the duration threshold; and for each segment of the identified subset of the generated segments, perform a segment fusioning process by merging the segment with a neighboring segment in the first representation based on cluster assignments related to the segment and neighboring frames at lower levels of the multi-level audio segmentation of the audio sequence, including the second representation.

14. The non-transitory computer-readable storage medium of claim 12, wherein the instructions, when executed, further cause the at least one processor to:

generate an audio segmentation representation of the audio sequence based on the generated segments; and select a level of the multi-level audio segmentation as an output based on a segmentation level selection.

15. The non-transitory computer-readable storage medium of claim 9, wherein the instructions, when executed, further cause the at least one processor to:

apply a beat detection algorithm to the audio sequence to identify the beats of the audio sequence.

16. The non-transitory computer-readable storage medium of claim 9, wherein the instructions, when executed, further cause the at least one processor to:

associate a first segment of the audio sequence with a second segment of the audio sequence when the first segment and the second segment include frames from a same first cluster of the one or more clusters.

17. A system, comprising:

a computing device including a memory and at least one processor, the computing device implementing an audio processing system, wherein the memory includes instructions stored thereon which, when executed, cause the audio processing system to:

receive an input including an audio sequence and a first segment value indicating a number of clusters to group frames of the audio sequence into;

extract features for each frame of the audio sequence, each frame associated with a beat of the audio sequence;

cluster the frames of the audio sequence into one or more clusters based on the extracted features and the first segment value;

generate segments of the audio sequence based on the clustered frames, each segment of the audio sequence formed by grouping consecutive frames of the audio sequence from a same cluster of the one or more clusters; and generate a first representation of the audio sequence using the generated segments of the audio sequence, wherein a subset of the generated segments with durations less than a duration threshold are fused with neighboring segments based on a second representation of the audio sequence generated using a second segment value.

18. The system of claim 17, wherein the instructions to extract the features for each frame of the audio sequence, further cause the audio processing system to:

process the audio sequence through an audio model trained to extract features for each frame of the audio sequence using deep audio embeddings.

19. The system of claim 17, wherein the instructions to generate segments of the audio sequence based on the clustered frames, further cause the audio processing system to:

assign each frame of the audio sequence a cluster identifier based on the extracted features, wherein frames associated with a same cluster identifier have similar extracted features.

20. The system of claim 17, wherein the instructions further cause the audio processing system to:

construct a multi-level audio segmentation of the audio sequence, wherein each level of the multi-level audio segmentation includes a different number of unique clusters, and wherein the multi-level audio segmentation includes the first representation with a first number of unique clusters based on the first segment value and the second representation with a second number of unique clusters based on the second segment value.

* * * * *